(12) United States Patent
Bowman et al.

(10) Patent No.: US 11,087,349 B1
(45) Date of Patent: Aug. 10, 2021

(54) SYSTEM FOR GENERATING REPLACEMENT DIGITAL PROMOTIONS BASED UPON INITIAL PROMOTION EXPIRATION AND RELATED METHODS

(71) Applicant: INMAR CLEARING, INC., Winston-Salem, NC (US)

(72) Inventors: Jacob Bowman, High Point, NC (US); Melissa Bube, High Point, NC (US); Joel Corra, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 174 days.

(21) Appl. No.: 16/156,664

(22) Filed: Oct. 10, 2018

(51) Int. Cl.
   *G06Q 30/02* (2012.01)
   *G06Q 20/40* (2012.01)

(52) U.S. Cl.
   CPC ....... *G06Q 30/0224* (2013.01); *G06Q 20/407* (2013.01); *G06Q 30/0235* (2013.01)

(58) Field of Classification Search
   None
   See application file for complete search history.

(56) References Cited

U.S. PATENT DOCUMENTS

| | | | | |
|---|---|---|---|---|
| 7,464,050 | B1* | 12/2008 | Deaton | G06Q 20/20 705/14.1 |
| 2002/0161631 | A1* | 10/2002 | Banerjee | G06Q 30/0269 705/14.35 |
| 2008/0065485 | A1* | 3/2008 | Hammond | G06Q 30/0239 705/14.25 |
| 2008/0270231 | A1* | 10/2008 | Li | G06Q 30/02 705/14.13 |
| 2010/0250351 | A1* | 9/2010 | Gillenson | G06Q 30/0216 705/14.13 |

(Continued)

OTHER PUBLICATIONS

Coupons in the News ("Walmart Couponer's Return Fraud Conviction Upheld"). Oct. 2, 2015. [retrieved from internet archive on Jun. 19, 2020] <URL: https://web.archive.org/web/20151005082345/ http://couponsinthenews.com/2015/10/02/walmart-couponers-return-fraud-conviction-upheld/> (Year: 2015).*

(Continued)

*Primary Examiner* — Bion A Shelden
(74) *Attorney, Agent, or Firm* — Allen, Dyer, Doppelt + Gilchrist, P.A.

(57) ABSTRACT

A system for processing a digital promotion may include a user device associated with a given user and a digital promotion processing server. The digital promotion processing server may include a processor and a memory cooperating therewith to, upon return of a purchased product associated with the given user, determine whether an initial digital promotion was applied to the purchased product, and if so, determine whether the initial digital promotion has expired. When the initial digital promotion has not expired, the processor may generate a first replacement digital promotion having a first promotional value associated therewith, and communicate the first replacement digital promotion to the user device. When the initial digital promotion has expired, the processor may generate a second replacement digital promotion having a second promotional value associated therewith that is less than the first promotional value, and communicate the second replacement digital promotion to the user device.

13 Claims, 8 Drawing Sheets

(56) References Cited

U.S. PATENT DOCUMENTS

| | | | |
|---|---|---|---|
| 2011/0119142 A1* | 5/2011 | Maraz | G07F 9/002 |
| | | | 705/21 |
| 2014/0297389 A1* | 10/2014 | Brown | G06Q 30/0231 |
| | | | 705/14.31 |
| 2016/0140595 A1* | 5/2016 | Werner | G06Q 20/3274 |
| | | | 705/14.26 |
| 2016/0321684 A1* | 11/2016 | Chen | G06Q 30/0208 |
| 2017/0061465 A1* | 3/2017 | Woodward | G06Q 20/10 |
| 2018/0211346 A1* | 7/2018 | Morren | G06Q 50/28 |

OTHER PUBLICATIONS

J.A. Peterson. Can Product Returns Make You Money? MIT Sloan Managment Review. Apr. 1, 2010. [retrieved from internet on May 7, 2021] <URL: https://sloanreview.mit.edu/article/can-product-returns-make-you-money/> (Year: 2010).*

* cited by examiner

SYSTEM FOR GENERATING REPLACEMENT DIGITAL PROMOTIONS BASED UPON INITIAL PROMOTION EXPIRATION AND RELATED METHODS

TECHNICAL FIELD

The present application relates to the field of electronics, and, more particularly, to digital promotion systems, and related methods.

BACKGROUND

Returning of a purchased item is part of the retail process. Returning of a purchased item to a retailer may involve, the purchaser taking the purchased item, mostly along with a receipt, back to the retailer in exchange for a refund, exchange, merchandise credit, etc. For online purchases, for example, returning of a purchased item may include requesting a return authorization from the retailer, repackaging the purchased item in a box or acceptable shipping container, affixing return shipping information to the box or container, and placing the box or container including the purchased item and return shipping information with the appropriate shipping provider.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A system for processing a digital promotion may include a user device associated with a given user and a digital promotion processing server. The digital promotion processing server may include a processor and a memory cooperating therewith to, upon return of a purchased product associated with the given user, determine whether an initial digital promotion was applied to the purchased product, and if so, determine whether the initial digital promotion has expired. When the initial digital promotion has not expired, the processor may generate a first replacement digital promotion having a first promotional value associated therewith, and communicate the first replacement digital promotion to the user device. When the initial digital promotion has expired, the processor may generate a second replacement digital promotion having a second promotional value associated therewith that is less than the first promotional value, and communicate the second replacement digital promotion to the user device.

The processor may be configured to determine whether the initial digital promotion has expired based upon an associated initial expiration date. The processor may be configured to determine, before determining whether the initial digital promotion was applied to the purchased product, whether a product return time window for the purchased product has expired, for example.

The purchased product may have a brand associated therewith. The first replacement digital promotion may be redeemable toward a product of the brand. The second replacement digital promotion may alternatively or additionally be redeemable toward a product of the brand.

The initial digital promotion may have an initial promotional value associated therewith equal to the first promotional value, for example. The processor may be configured to determine a retailer associated with the purchased product, and at least one of the first and second replacement digital promotions may be redeemable at the retailer.

The given user may have a user identifier associated therewith. The processor may be configured to determine whether the initial digital promotion was applied to the purchased product based upon the user identifier, for example. The processor may be configured to obtain a purchased product history associated with the given user based upon the user identifier, and generate at least one of the first and second replacement digital promotions based upon the purchased product history.

The initial digital promotion may have an initial promotional value associated therewith. The first replacement digital promotion may be redeemable toward repurchase of the purchased product, and the first promotional value may be greater than the initial promotional value, for example.

A method aspect is directed to a method of processing a digital promotion. The method may include using a processor and a memory cooperating therewith to, upon return of a purchased product associated with a given user, determine whether an initial digital promotion was applied to the purchased product, and if so, determine whether the initial digital promotion has expired. The processor may also be used to, when the initial digital promotion has not expired, generate a first replacement digital promotion having a first promotional value associated therewith, and communicate the first replacement digital promotion to a user device associated with the given user. The processor may further be used to, when the initial digital promotion has expired, generate a second replacement digital promotion having a second promotional value associated therewith that is less than the first promotional value, and communicate the second replacement digital promotion to the user device.

A computer readable medium aspect is directed to a non-transitory computer readable medium for processing a digital promotion. The non-transitory computer readable medium includes computer executable instructions that when executed by a processor cause the processor to perform operations upon return of a purchased product associated with a given user. The operations may include determining whether an initial digital promotion was applied to the purchased product, and if so, determining whether the initial digital promotion has expired. When the initial digital promotion has not expired, the operations may include generating a first replacement digital promotion having a first promotional value associated therewith, and communicating the first replacement digital promotion to a user device associated with the given user. When the initial digital promotion has expired, the operations include generating a second replacement digital promotion having a second promotional value associated therewith that is less than the first promotional value, and communicating the second replacement digital promotion to the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation and numbers in increments of 100, are used to indicate similar elements in alternative embodiments.

Figure 1:
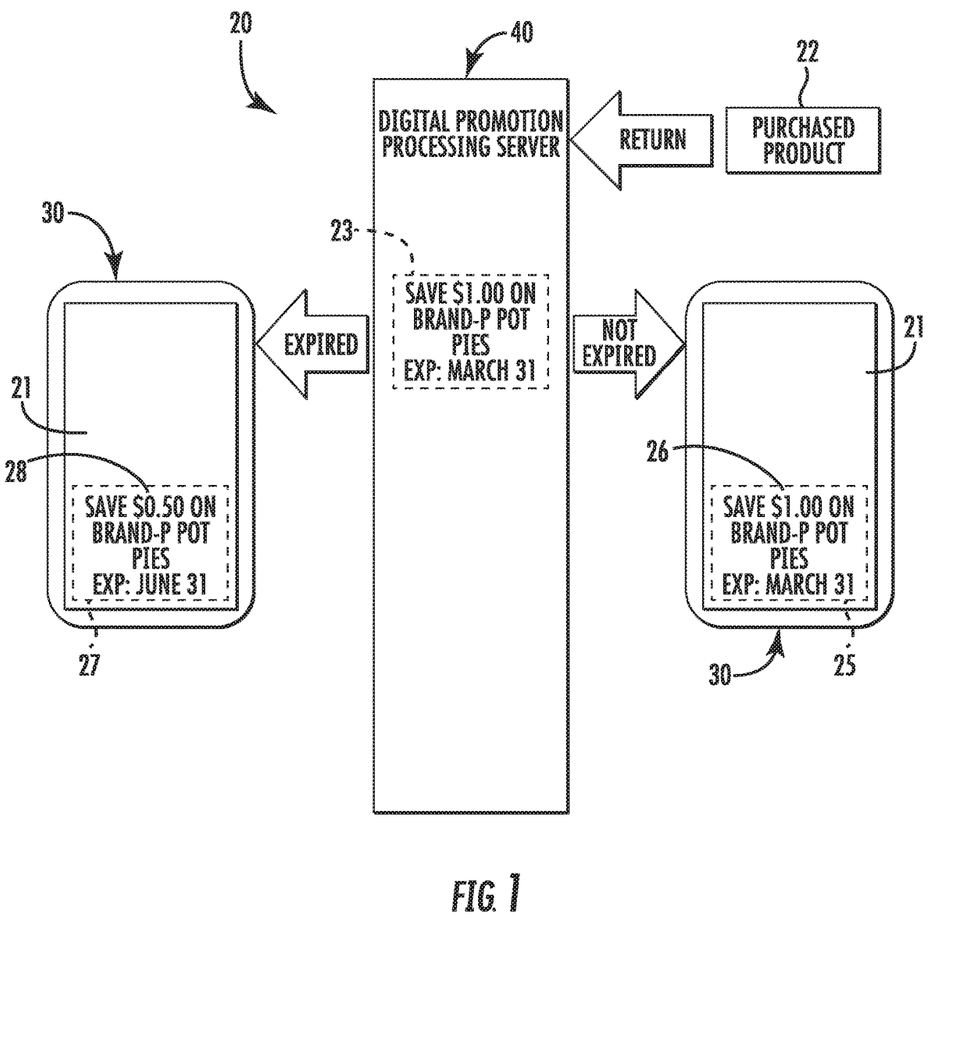
FIG. 1 is a schematic diagram of a system for processing a digital promotion in accordance with an embodiment.
Figure 2:
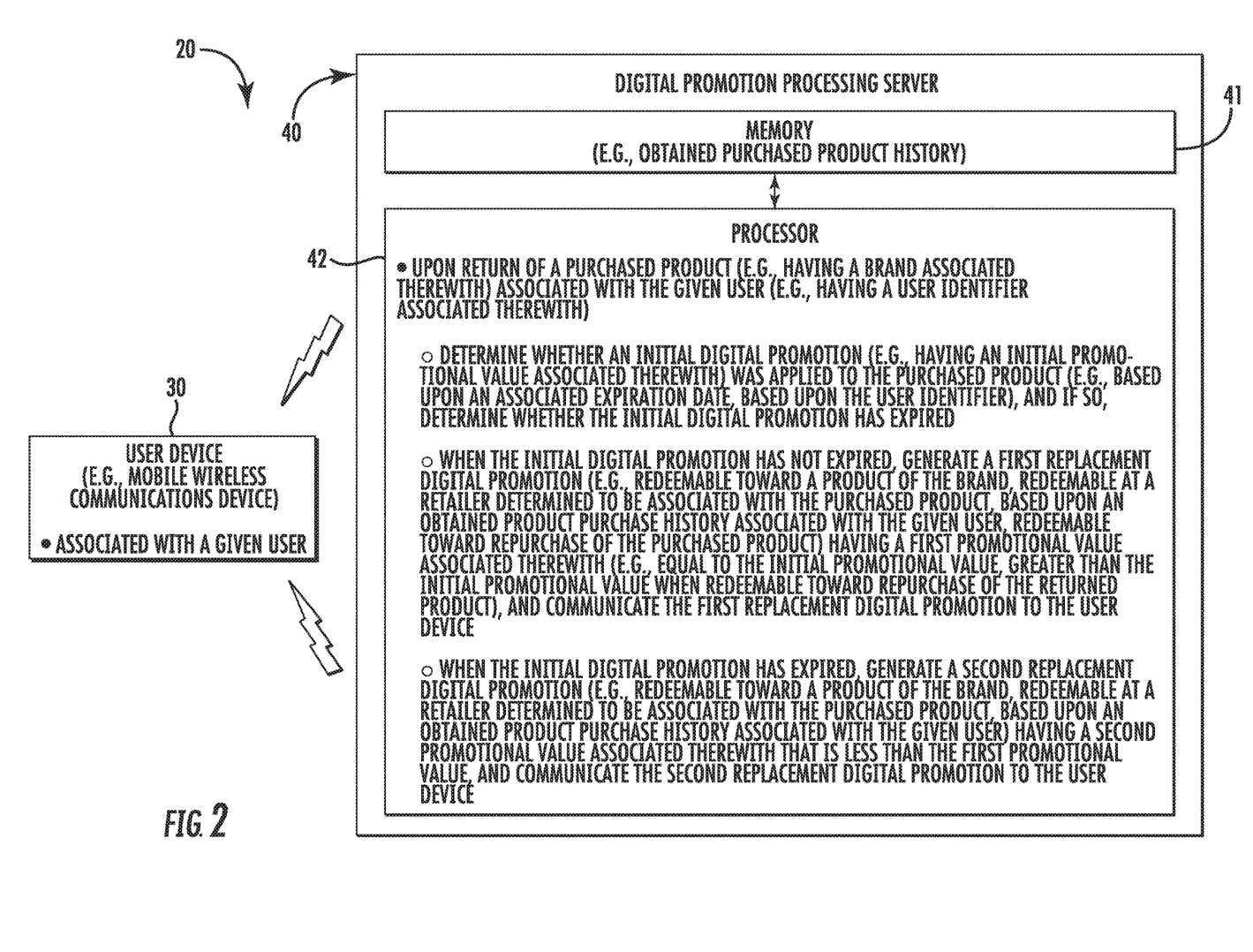
FIG. 2 is a schematic block diagram of a system for processing a digital promotion in accordance with an embodiment.

Referring initially to FIGS. 1-2, a system for processing a digital promotion 20 includes a user device 30 associated with a given user. The user device 30 is illustratively in the form of a mobile wireless communications device, such as, for example, a mobile or smart phone. The user device 30 may be another type of device, for example, a personal computer either wired or wireless, a tablet computer, and/or a wearable device. Of course the user device 30 may be another type of device as will be appreciated by those skilled in the art.

The system for processing a digital promotion 20 also includes a digital promotion processing server 40. The digital promotion processing server 40 includes a memory 41 and a processor 42 that cooperates with the memory 41. It should be understood that while operations of the digital promotion processing server 40 are described herein, those operations are based upon cooperation of the memory 41 and the processor 42. The digital promotion processing server 40 may communicate with the user device 30 by way of one or more communications networks, for example, the Internet.

Figure 3:
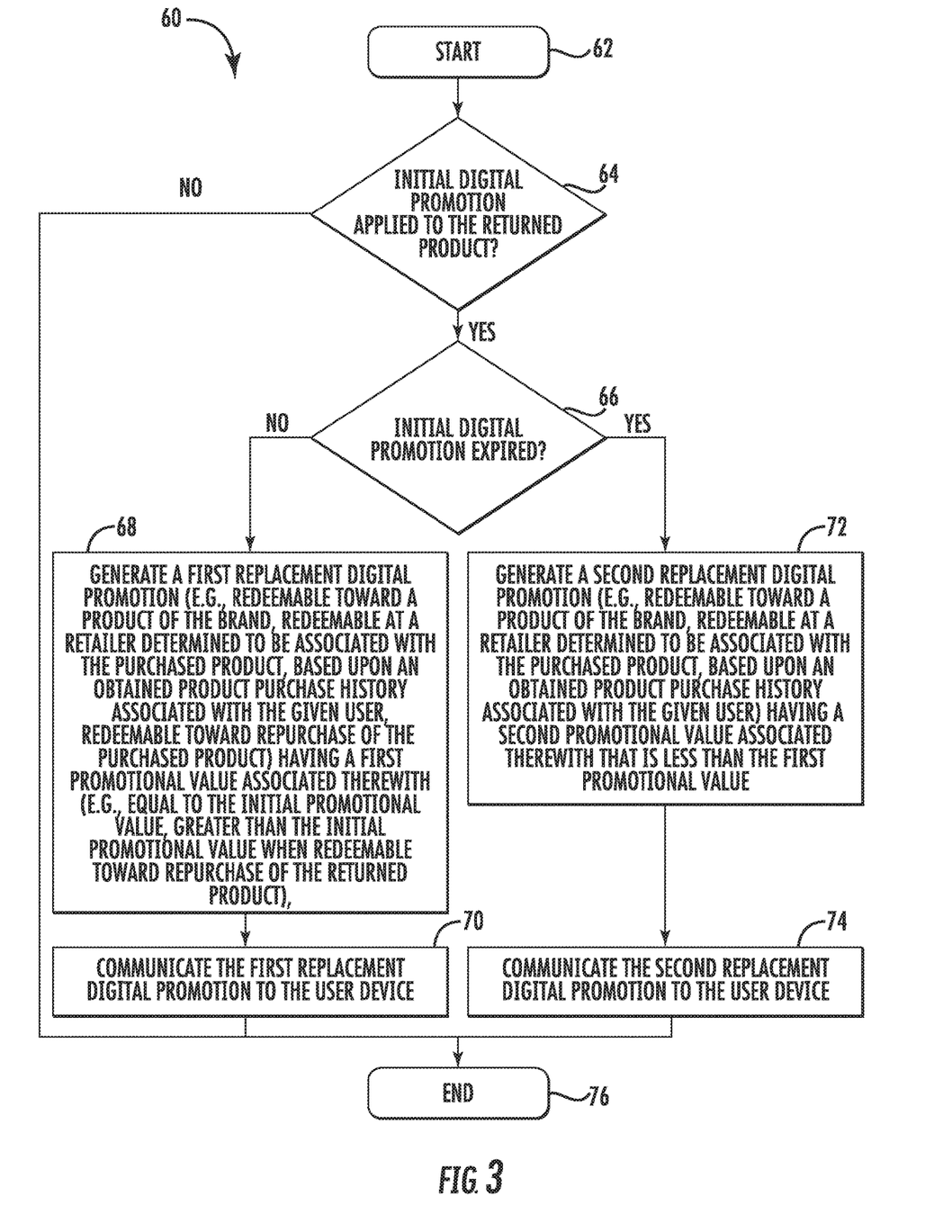
FIG. 3 is a flow chart illustrating operation of a digital promotion processing server of the system of FIG. 2.

Referring now additionally to the flowchart 60 in FIG. 3, beginning at Block 62 operation of the system 20 with respect to the digital promotion processing server 40 will be described. At Block 64, upon return of a purchased product 22 associated with the given user, the digital promotion processing server 40 determines whether an initial digital promotion 23 was applied to the purchased product. The initial digital promotion 23 may be in the form of a digital coupon or digital rebate for example, and may have been applied to the purchase of the purchased product 22 during a purchase transaction, for example, at a point-of-sale (POS) terminal at a retailer 24.

The digital promotion processing server 40 may determine whether the initial digital promotion 23 was applied to the purchased product 22 based upon a user identifier associated with the given user. The user identifier may be a username, social media handle, phone number, loyalty program identifier, and/or any other user identifier, as will be appreciated by those skilled in the art. More particularly, in an implementation example, the loyalty program identifier associated with the given user and retailer 24 may be used to access a purchased product history of the given user at the retailer. The purchased product history may include a listing of products purchased by the given user, the amount or cost of each product, product purchase dates and locations, and whether any digital promotions were used for any of the purchased products 22 or for the purchase.

If, at Block 64, the digital promotion processing server 40 determines that an initial digital promotion 23 was applied to the purchased product 22, the digital promotion processing server determines whether the initial digital promotion has expired (Block 66). As will be appreciated by those skill in the art, the initial digital promotion 23, when issued by the promotion provider, for example, the corresponding manufacturer, has an initial expiration date associated (e.g. the original date when the initial digital promotion expires). For example, the initial digital promotion 23 may have issued on January 1 and expires on March 31. If an initial digital promotion 23 was not applied to the returned product, the operations end at Block 76.

The digital promotion processing server 40 determines whether the initial digital promotion 23 has expired by comparing the current date (i.e., of the return of the purchased product 22) with the initial expiration date. For example, if the current date (i.e., the date of the return) is April 5, the initial digital promotion 23 has expired, while if the current date is March 15, the initial digital promotion has not expired.

When, at Block 66, it is determined that the initial digital promotion 23 has not expired, the digital promotion processing server 40 generates a first replacement digital promotion 25 that has a first promotional value 26 associated therewith (Block 68). The first replacement digital promotion 25 may be for the same brand of product as the purchased (now returned) product. Moreover, the first promotional value 26 may be the same or as or equal to the promotional value of the initial digital promotion. For example, if the initial digital promotion 23 was for $1.00 off any variety of Brand-P Pot Pies, the first replacement digital promotion 25 may also be for $1.00 off any variety of Brand-P Pot Pies. In some embodiments, the first replacement digital promotion 25 may be for another brand of product and/or may have a promotional value less than the promotional value of the initial digital promotion 23.

Figure 4:
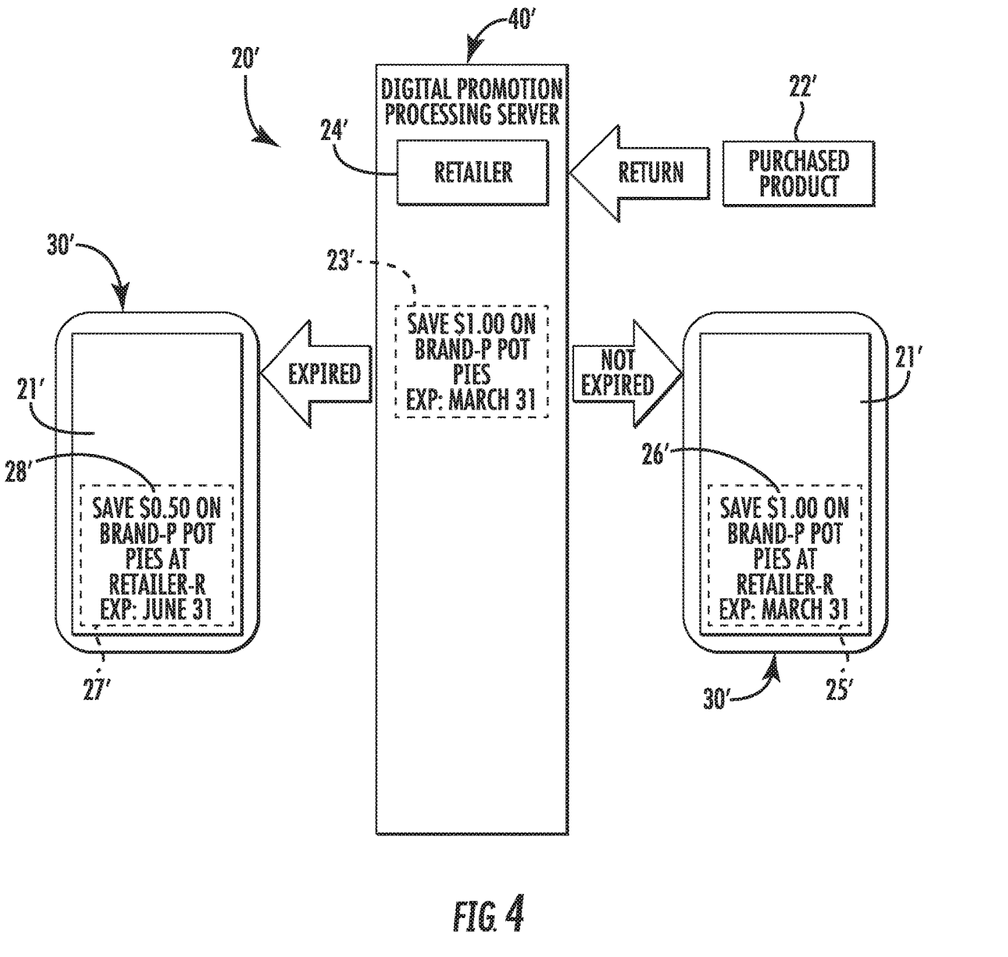
FIG. 4 is a schematic diagram of an implementation example of a digital promotion processing system in accordance with an embodiment.

Referring now briefly to FIG. 4, in some embodiments, the digital promotion processing server 40' may determine the retailer 24' associated with the purchased (now returned) product for example, from among retailers and based upon the user identifier. The digital promotion processing server 40' may generate the first replacement digital promotion 25' for the same retailer 24' as the purchased product 22'. In other words, the first replacement digital promotion 25' may be retailer specific. Elements illustrated, but not specifically described are similar to those above with respect to the embodiments described in FIGS. 1-3.

Figure 5:
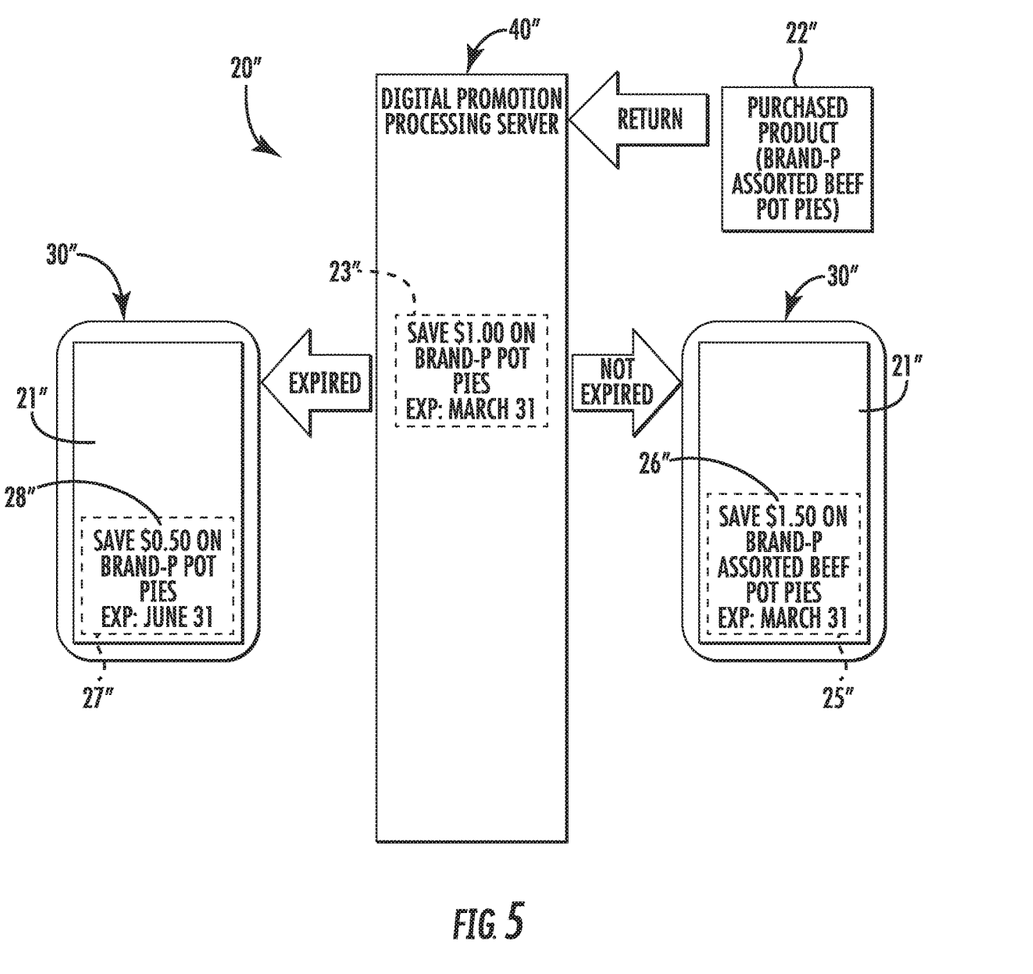
FIG. 5 is a schematic diagram of another implementation example of a digital promotion processing system in accordance with an embodiment.

Referring now briefly to FIG. 5, the first replacement digital promotion 25", in an embodiment, may be for the same product as the purchased (now returned) product and have a first promotional value 26" that is greater than the promotional value of the initial digital promotion 23". Those skilled in the art will appreciate that by generating a first replacement digital promotion 25" that has a value greater than the initial digital promotion 23", the given user may consider repurchasing the purchased product 22" with the added savings. Of course, this may be dependent on the given user's reason for returning the purchased product 22". Elements illustrated, but not specifically described are similar to those above with respect to the embodiments described in FIGS. 1-3.

In some implementations, the first replacement digital promotion 25 may have an expiration date associated therewith, for example that is the same as the expiration date of the initial digital promotion 23 (FIG. 1). Thus, those skilled in the art will appreciate that it may be possible that the first replacement digital promotion 25 may have an expiration date that is as small as one day.

Figure 6:
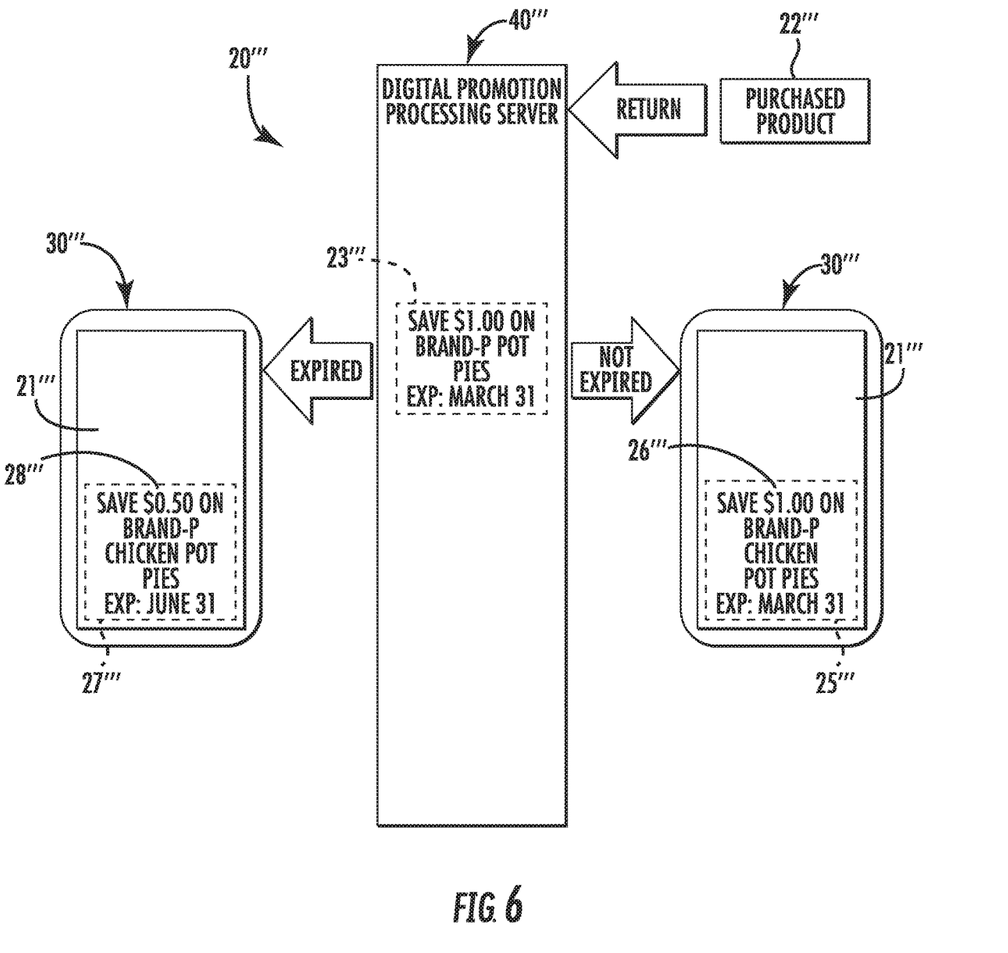
FIG. 6 is a schematic diagram of another implementation example of a digital promotion processing system in accordance with an embodiment.

Still further, referring briefly to FIG. 6, in another embodiment, the digital promotion processing server 40''' may generate the first replacement digital promotion 25''' based upon the given user's purchased product history, for example, stored in the memory 41'''. For example, the first replacement digital promotion 25''' may be for a product the given user regularly purchases and/or whose purchasing frequency has dropped over time. In another example, if the initial digital promotion 23''' was for Brand-P Beef Pot Pies and the digital promotion processing server 40''', based upon the purchased product history, determines that the given user has not been purchasing red meat, the digital promotion processing server may generate the first replacement digital promotion 25''' to be for Brand-P Chicken Pot Pies. Of course, the first replacement digital promotion 25''' may be determined based upon a retailer's and/or manufacturer's promotional rules. The second replacement digital promotion 27''' may be similarly generated based upon the product purchase history. Elements illustrated, but not specifically described are similar to those above with respect to the embodiments described in FIGS. 1-3.

Referring again to FIGS. 1-3, the first replacement digital promotion 25 is communicated to the user device 30 (Block 70). The first replacement digital promotion 25 may be communicated to the user device 30, for example, wirelessly, via one or more networks, for example, the Internet. In some embodiments, the first replacement digital promotion 25 may be displayed on a display 21 of the user device 30 and may be optionally saved to a digital wallet associated with the given user and/or user device.

When, at Block 66, it is determined that the initial digital promotion 23 has expired, the digital promotion processing server 40 generates a second replacement digital promotion 27 that has a second promotional value 28 associated therewith (Block 72). The second promotional value 28 is less than the first promotional value 26 associated with the first replacement digital promotion 25. The second replacement digital promotion 27 may be for the same brand of product as the purchased (now returned) product. For example, if the initial digital promotion 23 was for $1.00 off any variety of Brand-P Pot Pies, the second replacement digital promotion 27 may be for $0.50 off any variety of Brand-P Pot Pies. In some embodiments, the second replacement digital promotion 27 may be for another brand of product.

In some embodiments, similar to the first replacement digital promotion 25', the digital promotion processing server 40' may generate the second replacement digital promotion 27' for the same retailer 24' as the purchased product 22' (FIG. 4). In other words, the second replacement digital promotion 27' may be retailer specific. The second replacement digital promotion 27' may be retailer specific while the first replacement digital promotion 25' may not be retailer specific.

The second replacement digital promotion 27 may have an expiration date associated therewith, for example, so that the second replacement digital promotion has a same valid duration as the initial digital promotion. Still further, similar to the first replacement digital promotion 25''' described above, in other embodiments, the digital promotion processing server 40''' may generate the second replacement digital promotion 27''' based upon the given user's purchased product history, for example (FIG. 6).

The second replacement digital promotion 27 is communicated to the user device 30 (Block 74). The second replacement digital promotion 27 may be communicated to the user device 30, for example, wirelessly, via one or more networks, for example, the Internet. In some embodiments, the second replacement digital promotion 27 may be displayed on the display 21 of the user device 30 and may be optionally saved to a digital wallet associated with the given user and/or user device. The operations end at Block 76.

Figure 7:
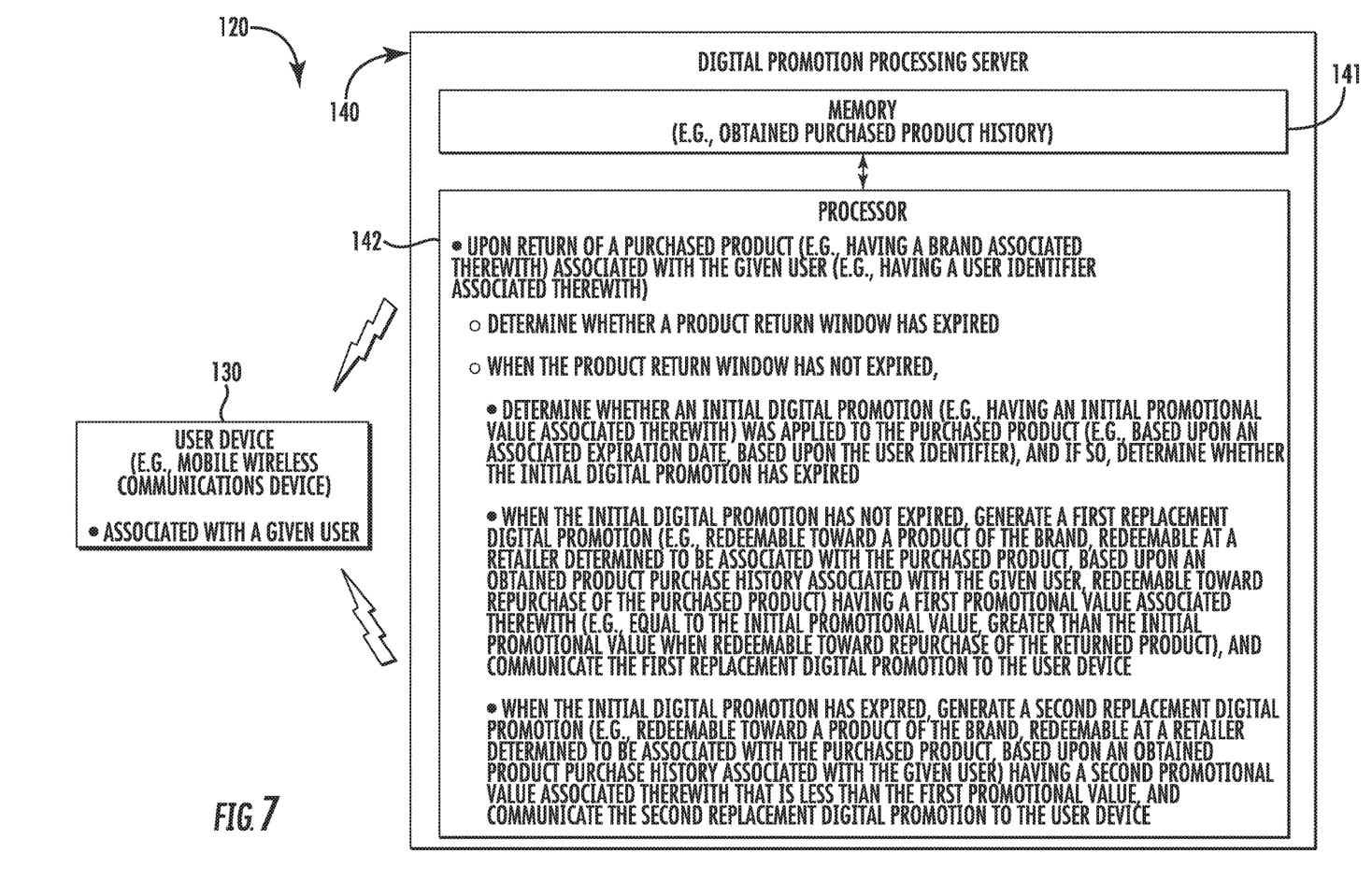
FIG. 7 is a schematic diagram of a digital promotion processing system in accordance with another embodiment.
Figure 8:
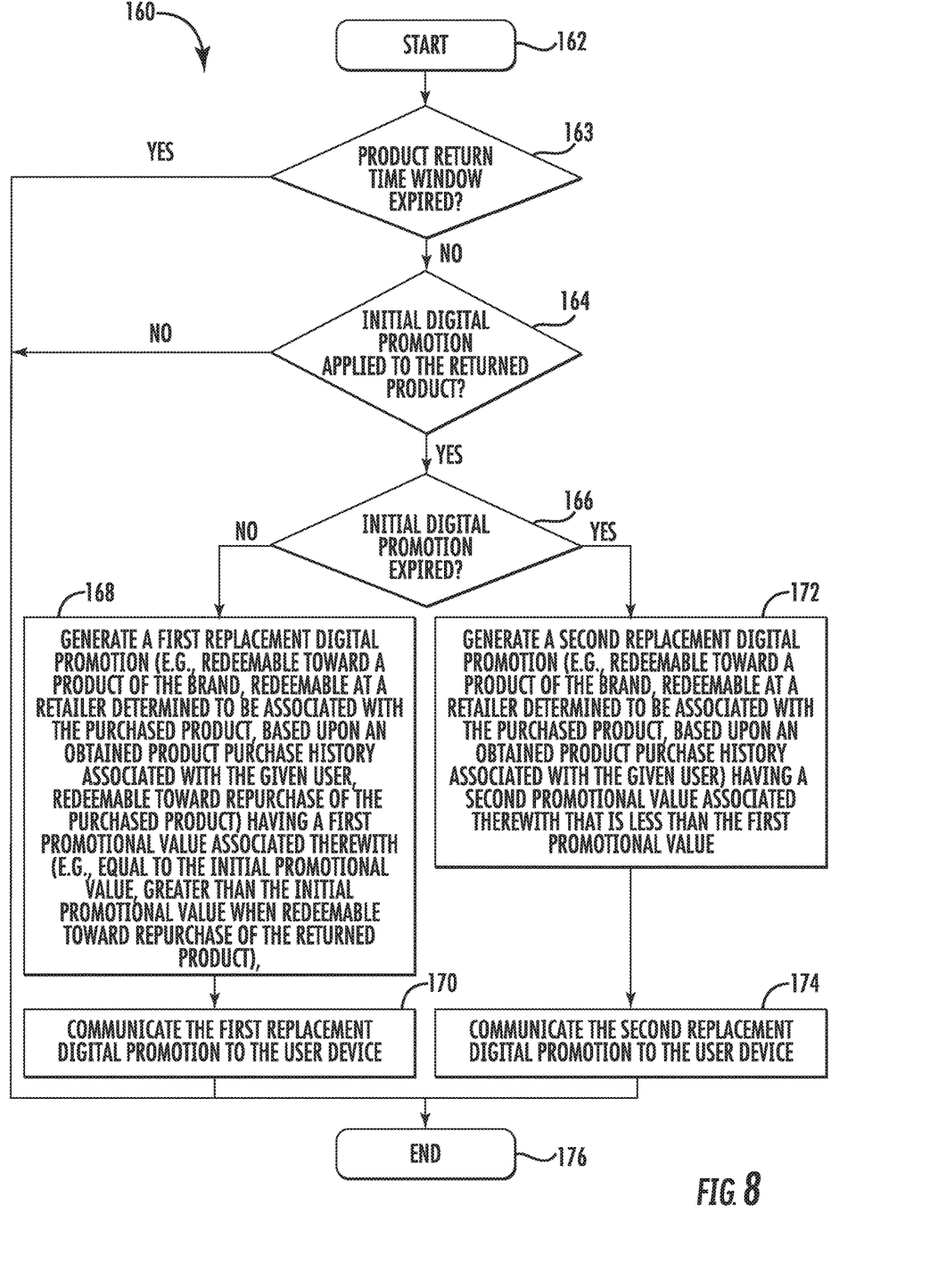
FIG. 8 is a flow chart illustrating operation of the digital promotion processing system of FIG. 7.

Referring now to FIG. 7, and the flowchart 160 in FIG. 8, in another embodiment, before determining whether the initial digital promotion 23 was applied to the purchased product 22 at Block 164, the digital promotion processing server 140 may determine, at Block 163, whether a product return time window for the purchased product 22 has expired. For example, the purchased product 22 may have a product return time window of 90-days. That is, the given user has 90-days from the date of purchase to return the purchased product 22. If, at Block 163, the product return time window has not expired, the operations described above with respect to FIGS. 1-3, continue, at Block 164, those operations needing no further discussion herein. If, at Block 163, the product return time window has expired, the process ends at Block 176. In other words, if the product return time window has expired, no replacement digital promotion will be generated. In some embodiments, the determination of whether the product return time window has expired may be made after the determination of whether the initial digital promotion 23 was applied to the purchased product 22, but before the determination of whether the initial digital promotion was applied to the purchased product. Elements illustrated, but not specifically described are similar to those above with respect to the embodiments described in FIGS. 1-3.

A method aspect is directed to a method of processing a digital promotion. The method includes using a processor 42 and a memory 41 cooperating therewith to, upon return of a purchased product 22 associated with a given user, determine whether an initial digital promotion 23 was applied to the purchased product, and if so, determine whether the initial digital promotion has expired. The processor is also used to, when the initial digital promotion 23 has not expired, generate a first replacement digital promotion 25 having a first promotional value 26 associated therewith, and communicate the first replacement digital promotion to a user device 30 associated with the given user. The processor 42 is further used to, when the initial digital promotion 23 has expired, generate a second replacement digital promotion 27 having a second promotional value 28 associated therewith that is less than the first promotional value 26, and communicate the second replacement digital promotion to the user device 30.

A computer readable medium aspect is directed to a non-transitory computer readable medium for processing a digital promotion. The non-transitory computer readable medium includes computer executable instructions that when executed by a processor 42 cause the processor to perform operations upon return of a purchased product 22 associated with a given user. The operations include determining whether an initial digital promotion 23 was applied to the purchased product 22, and if so, determining whether the initial digital promotion has expired. When the initial digital promotion 23 has not expired, the operations include generating a first replacement digital promotion 25 having a first promotional value 26 associated therewith, and communicating the first replacement digital promotion to a user device 30 associated with the given user. When the initial digital promotion 23 has expired, the operations include generating a second replacement digital promotion 27 having a second promotional value 28 associated therewith that is less than the first promotional value 26, and communicating the second replacement digital promotion to the user device 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a digital promotion comprising:
   a user device associated with a given user having a user identifier and loyalty account associated therewith;
   a point-of-sale (POS) terminal; and
   a digital promotion processing server comprising a memory and a processor configured to store products purchased at the POS terminal based upon the loyalty account, and upon return of a purchased product associated with the given user,
      access the loyalty account of the given user using the user identifier,
      determine whether an initial digital promotion having an initial promotional value associated therewith was applied to the purchased product during a purchase transaction at the POS terminal based upon the access to the loyalty account using the user identifier, and if so, determine whether the initial digital promotion has expired,
      when the initial digital promotion has not expired, generate a first replacement digital promotion redeemable toward repurchase of the purchased product and having a first promotional value associated therewith that is greater than the initial promotional value, communicate the first replacement digital promotion to the user device, and save the first replacement digital promotion to a digital wallet associated with the given user, and
      when the initial digital promotion has expired, obtain a purchased product history based upon the access to the loyalty account using the user identifier, determine product type purchase trends and purchase frequencies for products of the product purchase history, determine a replacement product based upon the replacement product having a dropping purchase frequency over time and being classified as being associated with a product type having a steady or increasing product type purchase trend, generate a second replacement digital promotion redeemable toward the replacement product and having a second promotional value associated therewith that is less than the first promotional value, communicate the second replacement digital promotion to the user device, and save the second replacement digital promotion to the digital wallet associated with the given user.

2. The system of claim 1 wherein the processor is configured to determine whether the initial digital promotion has expired based upon an associated initial expiration date.

3. The system of claim 1 wherein the processor is configured to determine, before determining whether the initial digital promotion was applied to the purchased product, whether a product return time window for the purchased product has expired.

4. The system of claim 1 wherein the purchased product has a brand associated therewith; and wherein the second replacement digital promotion is redeemable toward a product of the brand.

5. The system of claim 1 wherein the processor is configured to determine a retailer associated with the purchased product; and wherein the second replacement digital promotion is redeemable at the retailer.

6. A digital promotion processing server comprising:
   a memory and a processor configured to,
      store products purchased at a point-of-sale (POS) terminal based upon a loyalty account associated with a given user, and upon return of a purchased product associated with the given user having a user identifier associated therewith,
      access the loyalty account of the given user using the user identifier,
      determine whether an initial digital promotion having an initial promotional value associated therewith was applied to the purchased product during a purchase transaction at the POS terminal based upon the access to the loyalty account using the user identifier, and if so, determine whether the initial digital promotion has expired,
      when the initial digital promotion has not expired, generate a first replacement digital promotion redeemable toward repurchase of the purchased product and having a first promotional value associated therewith that is greater than the initial promotional value, communicate the first replacement digital promotion to a user device associated with the given user, and save the first replacement digital promotion to a digital wallet associated with the given user, and
      when the initial digital promotion has expired, obtain a purchased product history based upon the access to the loyalty account using the user identifier, determine product type purchase trends and purchase frequencies for products of the product purchase history, determine a replacement product based upon the replacement product having a dropping purchase frequency over time and being classified as being associated with a product type having a steady or increasing product type purchase trend, generate a second replacement digital promotion redeemable toward the replacement product and having a second promotional value associated therewith that is less than the first promotional value, communicate the second replacement digital promotion to the user device, and save the second replacement digital promotion to the digital wallet associated with the given user.

7. The digital promotion processing server of claim 6 wherein the processor is configured to determine whether the initial digital promotion has expired based upon an associated initial expiration date.

8. The digital promotion processing server of claim 6 wherein the processor is configured to determine, before determining whether the initial digital promotion was applied to the purchased product, whether a product return time window for the purchased product has expired.

9. The digital promotion processing server of claim 6 wherein the purchased product has a brand associated therewith; and wherein the second replacement digital promotion is redeemable toward a product of the brand.

10. A non-transitory computer readable medium for processing a digital promotion, the non-transitory computer readable medium comprising computer executable instructions that when executed by a processor cause the processor to perform operations upon return of a purchased product associated with a given user having a user identifier associated therewith, the operations comprising:

accessing a loyalty account of the given user using the user identifier;

determining whether an initial digital promotion having an initial promotional value was applied to the purchased product during a purchase transaction at a point-of-sale (POS) terminal based upon the accessing of the loyalty account using the user identifier, and if so, determining whether the initial digital promotion has expired;

when the initial digital promotion has not expired, generating a first replacement digital promotion redeemable toward repurchase of the purchased product and having a first promotional value associated therewith that is greater than the initial promotional value, communicating the first replacement digital promotion to a user device associated with the given user, and saving the first replacement digital promotion to a digital wallet associated with the given user; and when the initial digital promotion has expired, 8obtaining a purchased product history based upon the access to the loyalty account using the user identifier, determining product type purchase trends and purchase frequencies for products of the product purchase history, determining a replacement product based upon the replacement product having a dropping purchase frequency over time and being classified as being associated with a product type having a steady or increasing product type purchase trend, generating a second replacement digital promotion redeemable toward the replacement product and having a second promotional value associated therewith that is less than the first promotional value, communicating the second replacement digital promotion to the user device, and saving the second replacement digital promotion to the digital wallet associated with the given user.

11. The non-transitory computer readable medium of claim 10 wherein the operations comprise determining whether the initial digital promotion has expired based upon an associated initial expiration date.

12. The non-transitory computer readable medium of claim 10 wherein the operations comprise determining, before determining whether the initial digital promotion was applied to the purchased product, whether a product return time window for the purchased product has expired.

13. The non-transitory computer readable medium of claim 10 wherein the purchased product has a brand associated therewith; and wherein the second replacement digital promotion is redeemable toward a product of the brand.

* * * * *

UNITED STATES PATENT AND TRADEMARK OFFICE
CERTIFICATE OF CORRECTION

| | | |
|---|---|---|
| PATENT NO. | : 11,087,349 B1 | |
| APPLICATION NO. | : 16/156664 | |
| DATED | : August 10, 2021 | |
| INVENTOR(S) | : Bowman et al. | |

It is certified that error appears in the above-identified patent and that said Letters Patent is hereby corrected as shown below:

In the Claims

Column 10, Line 6 Claim 10    Delete: "8obtaining"
Insert: --obtaining--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*